UNITED STATES PATENT OFFICE.

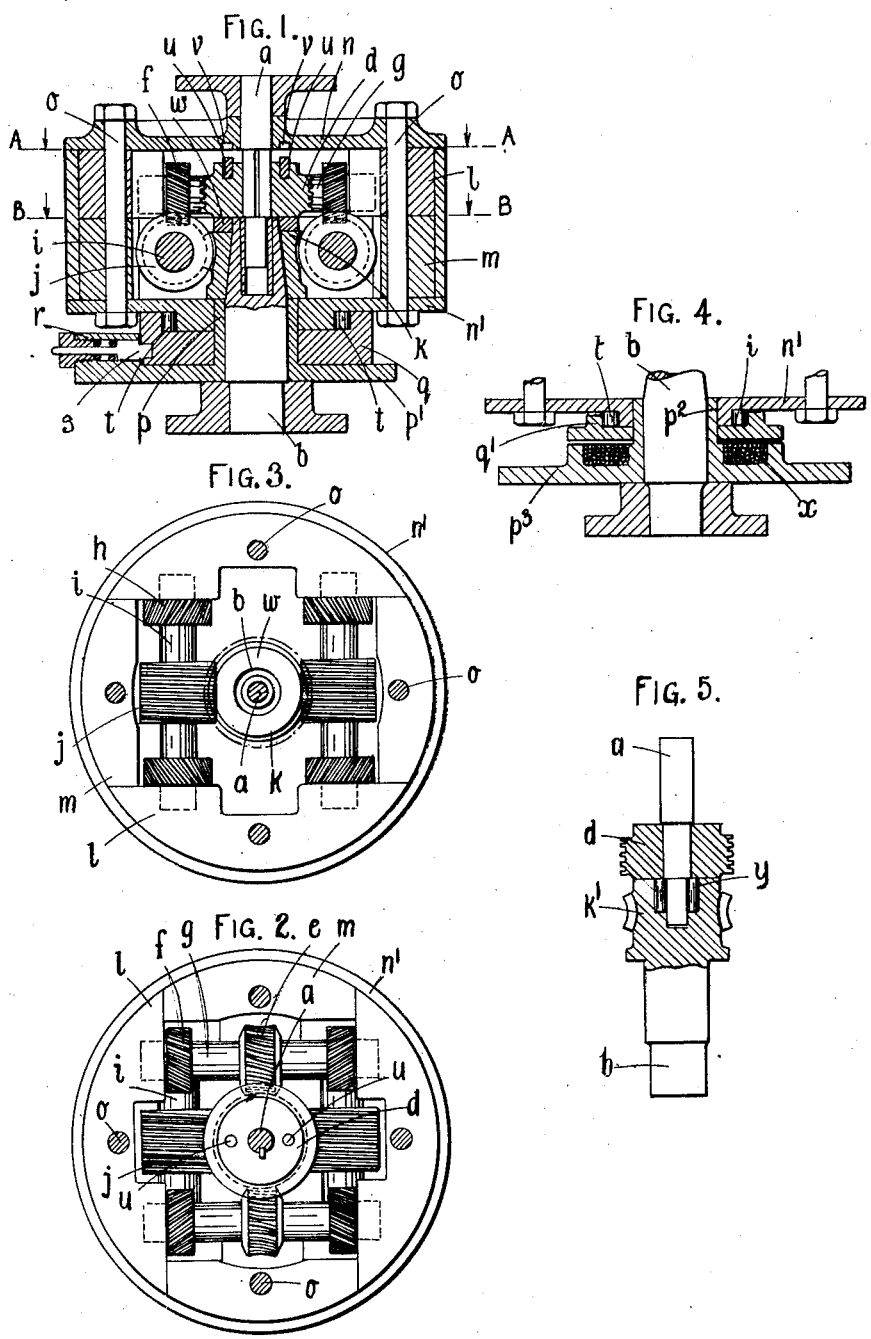

ERNEST CHARLES HATCHER, OF FINCHLEY, LONDON, AND THOMAS ROOKE, OF HAMPSTEAD, LONDON, ENGLAND.

REDUCTION-GEAR.

1,384,662. Specification of Letters Patent. Patented July 12, 1921.

Application filed January 20, 1921. Serial No. 438,699.

*To all whom it may concern:*

Be it known that we, ERNEST CHARLES HATCHER, a subject of the King of Great Britain, residing at Finchley, London, England, and THOMAS ROOKE, a subject of the King of Great Britain, residing at Hampstead, London, England, have invented certain new and useful Improvements in Reduction-Gears, of which the following is a specification.

This invention relates to improvements in reduction gear applicable, for example, for starting heavy motors by hand power, or by small auxiliary or starting motors.

According to this invention, a starting (driving) shaft is arranged in alinement with the shaft to be started (driven) and these shafts are connected by gearing mounted within a casing, and, in one constructional form, comprising a worm on the starting shaft in gear with a worm wheel mounted on a spindle arranged transversely or at right angles to the starting shaft, gearing connecting this spindle to a second spindle which is also arranged transversely or at right angles to the starting shaft, and a worm on the second spindle in gear with a worm wheel on the shaft to be started. Means are also provided for holding the said casing stationary or releasing the casing so that it can rotate. The velocity ratio of this gearing provides for a slow movement of the driven shaft relatively to the driving shaft, both shafts rotating in the same direction, when the casing is held stationary by the means above referred to, but in the event of the driven shaft overrunning the driving shaft, the casing is set free to rotate in the same direction and then the driven shaft, the casing and the driving shaft all rotate together at the same speed.

The accompanying drawing shows how the said invention can be conveniently and advantageously carried into practice.

In this drawing:—

Figure 1 shows, in central longitudinal section a reduction gear constructed according to this invention.

Fig. 2 shows a transverse section thereof on the line A—A Fig. 1, and

Fig. 3 shows a transverse section thereof on the line B—B, Fig. 1.

Figs. 4 and 5 are detail views of modified arrangements hereinafter referred to.

As shown in this drawing, $a$ is a starting (driving) shaft which can be operated, for example, by hand or by a small starting motor (not shown), and which is arranged in alinement with a shaft $b$ to be started (driven). The gearing connecting these shafts comprises a worm $d$ mounted on the shaft $a$ to rotate therewith and drive a worm wheel $e$ mounted together with a skew, helical or like gear wheel $f$ on a spindle $g$ mounted transversely to the common axis of the shafts $a$, $b$. This gear wheel $f$ is in mesh with a corresponding gear wheel $h$ mounted on a spindle $i$ together with a worm $j$ in gear with a worm wheel $k$ fast on the shaft $b$. The spindle $i$ is likewise arranged transversely to the axis of the shafts $a$, $b$.

As will be seen from the drawing, parts of the gearing connecting the shafts $a$ and $b$ are duplicated but this construction is adopted merely to provide a symmetrical or balanced arrangement. The spindles $g$ and $i$ are mounted in bearings provided in blocks $l$ which together with distance pieces $m$ and end plates $n$, $n'$ form a casing for the gearing, the separate parts of the casing being held together by bolts $o$ so that the gearing can be conveniently mounted therein or access had thereto for purposes of adjustment or repair.

The shaft $a$ passes through a free bearing provided in the end plate $n$ and the shaft $b$ is rotatably mounted in a flanged sleeve or bearing $p$ secured against rotary movement with the shaft by bolting it to any convenient fixed part. The end plate $n'$ is rotatable on the said sleeve on which a ring $q$ is also rotatably mounted. The flange $p'$ of the sleeve $p$ carries a housing $r$ for a spring pressed latch $s$ or equivalent device by means of which the ring $q$ is normally held stationary, and a ratchet device is interposed between the ring $q$ and the end plate $n'$ directed to allow the casing to turn in the same direction as the shafts $a$, $b$ but not in the opposite direction. As shown rollers $t$ are inserted in tapering pockets or recesses between the ring $q$ and a boss on the end plate $n'$, but any convenient form of ratchet device may be substituted for this arrangement.

With this construction, when the shaft $a$ is rotated and the tendency of the casing to rotate in the opposite direction is resisted by the ratchet rollers $t$, ring $q$ and latch $s$, there is a reduction of speed from the shaft

*a* to the spindle *g* and a further multiplying reduction from the spindle *i* to the shaft *b*. When the shaft *b* has been started and overruns the shaft *a*, then, by reason of the engagement of the worm wheel *k* with the worm *j*, the casing will be caused to rotate with the shaft *b*, the ratchet rollers *t* permitting rotation of the casing in this direction. If any restraint is then placed on the shaft *a* or this shaft remains at rest, this has the same effect as would be caused by reverse rotation of the shaft *a*, whereby the casing will be caused to overrun the shaft *b*. In order to limit such movement the worm *d* is arranged so that it can move axially and carry pins or dogs *u* thereon into recesses *v* in the end plate *n* so that the gearing is locked up and rotates as a whole from the shaft *b* to the shaft *a*.

When the shaft *a* is rotated forwardly to drive the shaft *b* the worm *d* will move across the worm wheel *e* away from the end plate *n*, withdrawing the pins *u* therefrom, until stopped by the abutment ring *w*, and thereafter rotation of the worm *d* causes rotation of the worm wheel *e*.

In the event of the improved starting gear being applied to the crank shaft of an internal combustion engine or in other cases in which the direction of rotation of the main shaft is liable to be accidentally or inadvertently reversed for short periods, then, in order to prevent injury to the starting gear by such reversal, when the casing commences to move back, being driven by the engagement of the worm wheel *k* with the worm *j*, after the rollers *t* have locked the casing end plate *n'* to the ring *q*, the latch *s* is forced back setting free the ring *q* to rotate with the casing and the shafts *a*, *b* as a whole.

Instead of the latch *s* a spring pressed ball, or a pawl, mounted in the flange *r* and engaging a recess or tooth in or on the ring *q* may be provided to hold or release this ring, as required. In another alternative arrangement in place of the latch *s* a magnetic clutch is provided, as shown in Fig. 4, in which *x* are electromagnetic windings which are arranged in a convenient recess in the flange $p^3$ of the fixed sleeve $p^2$ and which when energized draw the ring *q'* into contact with the flange $p^3$ so that a braking effect is exerted to prevent rotation of the said ring. The circuit through these windings is controlled by any convenient form of switch arranged for example in association with the shaft *a* in such a manner that when power is applied to this shaft in order to drive the shaft *b*, current is caused to flow through these windings and the casing is then held against rotation. At all other times the electromagnets are deënergized and the casing is free to rotate in either direction. The rollers *t* allow the casing to rotate with the shaft *b* when the latter overruns the shaft *a*, or when these shafts rotate together, in case the current through the windings *w* is not cut off immediately the shaft *b* becomes the driving member.

Fig. 5 shows an arrangement which may be employed instead of the pins *u* and recesses *v* to lock the shaft *a* to the shaft *b*, wherein rollers *y* are lodged in circumferentially tapering recesses formed in the part of the shaft *b* into which the shaft *a* extends so as to operate as a ratchet clutch between these shafts. So long as the shaft *a* is driving the shaft *b* through the gearing within the casing, the shaft *a* can turn relatively to the shaft *b* but when the latter commences to overrun the shaft *a* the ratchet clutch becomes effective to lock together the two shafts. The worm wheel *k'* is shown integral with the shaft *b*.

Antifriction bearings and thrust rings may be provided between any of the relatively moving parts, as may be convenient or desirable.

We claim:—

1. In a gear for transmitting motion from a driving shaft to a driven shaft, spindles mounted transversely to the shafts, each of said spindles carrying a worm wheel, gearing connecting the said spindles, a worm on the driving shaft in gear with the worm wheel on one of the said spindles, and a worm wheel on the driven shaft in gear with the worm on the other spindle.

2. In a gear for transmitting motion from a driving shaft to a driven shaft, a rotatable casing, spindles mounted in the said casing transversely to the shafts each carrying a worm wheel, gearing connecting the said spindles, a worm on the driving shaft in gear with the worm wheel on one of the said spindles, a worm on the driven shaft in gear with the worm wheel on the other spindle and a ratchet device arranged to hold the casing against rotation by the reaction of the thrust between the worm wheel on the driven shaft and the worm in gear therewith.

3. In a gear for transmitting motion from a driving shaft to a driven shaft in alinement therewith, the combination of a rotatable casing around the adjacent ends of the shafts, two spindles mounted in the said casing transversely to one another and to the said shafts and geared together, gearing connecting one of the spindles to one shaft, gearing connecting the other spindle to the other shaft, a rotatably mounted ring arranged coaxially with the casing and a ratchet device between the casing and the ring.

4. In a gear for transmitting motion from a driving shaft to a driven shaft in alinement therewith, the combination of a rotatable casing around the adjacent ends of the shafts, spindles mounted in the said casing transversely to the shafts and geared together, the axes of the spindles and of the shafts lying in different planes, gearing connecting one of the spindles to one shaft, gearing connecting the other spindle to the other shaft, a rotatably mounted ring arranged coaxially with the casing and a ratchet device between the casing and the ring.

5. In a gear for transmitting motion from a driving shaft to a driven shaft in alinement therewith, the combination of a rotatable casing around the adjacent ends of the shafts, spindles mounted in said casing and geared together, a worm gearing connecting one of the spindles to one shaft, worm gearing connecting the other spindle to the other shaft, a rotatably mounted ring arranged coaxially with the casing and a ratchet device between the casing and the ring.

6. In a gear for transmitting motion from a driving shaft to a driven shaft in alinement therewith, the combination of a rotatable casing around the adjacent ends of the shafts, spindles mounted in the said casing and geared together, gearing connecting one of the spindles to one shaft, gearing connecting the other spindle to the other shaft, a rotatably mounted ring arranged coaxially with the casing, a ratchet device between the casing and the ring, and means for controlling rotary movement of the said ring.

7. In a gear for transmitting motion from a driving shaft to a driven shaft in alinement therewith, the combination of a rotatable casing around the adjacent ends of the shafts, spindles mounted in the said casing and geared together, gearing connecting one of the spindles to one shaft, gearing connecting the other spindle to the other shaft, a rotatably mounted ring arranged coaxially with the casing, a ratchet device between the casing and the ring, a fixed sleeve on which the said ring is mounted, and means for holding the said ring against rotation on the said sleeve.

8. In a gear for transmitting motion from a driving shaft to a driven shaft in alinement therewith, the combination of a rotatable casing around the adjacent ends of the shafts, spindles mounted in the said casing and geared together, gearing connecting one of the spindles to one shaft, gearing connecting the other spindle to the other shaft, a rotatably mounted ring arranged coaxially with the casing, a ratchet device between the casing and the ring, a fixed sleeve on which the said ring is mounted, and a latch mounted in a housing formed integrally with the said sleeve, and arranged to allow rotation of the said ring in one direction only.

9. In a gear for transmitting motion from a driving shaft to a driven shaft in alinement therewith, the combination of a rotatable casing around the adjacent ends of the shafts, spindles mounted in the said casing transversely to the said shafts and geared together, gearing connecting one of the spindles to one shaft, gearing connecting the other spindle to the other shaft, and means for locking the driving spindle to the driven spindle when the latter overruns the former.

10. In a gear for transmitting motion from a driving shaft to a driven shaft in alinement therewith, the combination of a rotatable casing around the adjacent ends of the shafts, spindles mounted in the said casing transversely to the said shafts and geared together, a worm wheel on one spindle, a worm in gear with the said worm wheel and mounted on one of the shafts to rotate therewith and to slide axially thereon, means for locking the worm to the casing when the worm is moved to one position on this shaft, and gearing connecting the other spindle to the other shaft.

11. In a gear for transmitting motion from a driving shaft to a driven shaft in alinement therewith, the combination of a rotatable casing around the adjacent ends of the shafts, a ratchet device for transmitting motion between the said shafts in one direction only, spindles mounted in the said casing transversely to the said shafts and geared together, gearing connecting one of the spindles to one shaft, and gearing connecting the other spindle to the other shaft.

ERNEST CHARLES HATCHER.
THOMAS ROOKE.

Witnesses:
   HERBERT A. BEESTON,
   F. CLEVERSLEY.